United States Patent
Mukae

(10) Patent No.: US 11,968,036 B2
(45) Date of Patent: Apr. 23, 2024

(54) JAMMING SATELLITE AVOIDANCE METHOD AND MEGA-CONSTELLATION BUSINESS DEVICE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/795,228

(22) PCT Filed: Mar. 15, 2021

(86) PCT No.: PCT/JP2021/010405
§ 371 (c)(1),
(2) Date: Jul. 26, 2022

(87) PCT Pub. No.: WO2021/187427
PCT Pub. Date: Sep. 23, 2021

(65) Prior Publication Data
US 2023/0052469 A1    Feb. 16, 2023

(30) Foreign Application Priority Data
Mar. 18, 2020  (JP) ................. 2020-048298

(51) Int. Cl.
*H04B 7/155*  (2006.01)
*B64G 1/10*   (2006.01)
*H04K 3/00*   (2006.01)

(52) U.S. Cl.
CPC ............ *H04K 3/22* (2013.01); *B64G 1/10* (2013.01); *H04B 7/155* (2013.01)

(58) Field of Classification Search
CPC .......... H04K 3/22; B64G 1/1021; B64G 1/10; H04B 7/155
See application file for complete search history.

(56) References Cited

U.S. PATENT DOCUMENTS 6,011,951 A * 1/2000 King ................ H04B 7/195
                                                455/13.2
9,651,946 B1 * 5/2017 Rubel ................ B64G 1/1021
(Continued)

FOREIGN PATENT DOCUMENTS

JP    2017-114159 A    6/2017

OTHER PUBLICATIONS

Office Action dated Feb. 7, 2023, in corresponding Japanese patent Application No. 2022-508352, 5 pages.
(Continued)

*Primary Examiner* — Keith Ferguson
(74) *Attorney, Agent, or Firm* — XSENSUS LLP

(57) ABSTRACT

A jamming satellite avoidance method changes an orbital altitude for each of orbital planes with different normal vectors in a mega-constellation satellite group composed of 100 or more satellites, so as to avoid a jamming satellite controlled by a ground device that is different from a device that controls the mega-constellation satellite group. The jamming satellite is an artificial satellite that includes a propulsion device and adopts a nominal orbital altitude and a nominal orbital inclination at which the mega-constellation satellite group flies, and maintains an average orbital altitude and an average orbital inclination while operating the propulsion device irregularly, and is controlled by the ground device that is different from the device that controls the mega-constellation satellite group.

4 Claims, 17 Drawing Sheets

(56) References Cited

U.S. PATENT DOCUMENTS

2018/0022474 A1    1/2018  Meek
2018/0370658 A1   12/2018  Amimoto et al.
2021/0036772 A1*   2/2021  Miranda .............. B64G 1/1085

OTHER PUBLICATIONS

International Search Report and Written Opinion dated May 25, 2021, received for PCT Application PCT/JP2021/010405, filed on Mar. 15, 2021, 17 pages including English Translation.

* cited by examiner

Fig.11

511: SPACE OBJECT ID
512: FORECAST EPOCH
513: FORECAST ORBITAL ELEMENTS
514: FORECAST ERROR
51: ORBIT FORECAST INFORMATION
52: SATELLITE ORBIT FORECAST INFORMATION
53: DEBRIS ORBIT FORECAST INFORMATION

| SATELLITE ID | DEBRIS ID | EPOCH | SIX KEPLERIAN ELEMENTS ||||||| PREDICTED ERROR |||
|---|---|---|---|---|---|---|---|---|---|---|---|
| | | | MEAN MOTION | ECCENTRICITY | INCLINATION | RAAN | ARGUMENT OF PERIGEE | MEAN ANOMALY | TRAVELING DIRECTION | ORTHOGONAL DIRECTION | BASIS |
| | | Year and date | Orbits /day | No unit | deg | deg | deg | deg | km | km | |
| A | | a1 | a2 | a3 | a4 | a5 | a6 | a7 | a8 | a9 | IN-ORBIT MEASUREMENT |
| B | | b1 | b2 | b3 | b4 | b5 | b6 | b7 | b8 | b9 | IN-ORBIT MEASUREMENT |
| C | | c1 | c2 | c3 | c4 | c5 | c6 | c7 | c8 | c9 | ANALYSIS |
| D | | d1 | d2 | d3 | d4 | d5 | d6 | d7 | d8 | d9 | GROUND MEASUREMENT |
| E | | e1 | e2 | e3 | e4 | e5 | e6 | e7 | e8 | e9 | GROUND MEASUREMENT |
| F | | f1 | f2 | f3 | f4 | f5 | f6 | f7 | f8 | f9 | SSA MEASUREMENT |
| | A | α1 | α2 | α3 | α4 | α5 | α6 | α7 | α8 | α9 | SSA MEASUREMENT |
| | B | β1 | β2 | β3 | β4 | β5 | β6 | β7 | β8 | β9 | SSA MEASUREMENT |
| | Γ | γ1 | γ2 | γ3 | γ4 | γ5 | γ6 | γ7 | γ8 | γ9 | SSA MEASUREMENT |
| | Δ | δ1 | δ2 | δ3 | δ4 | δ5 | δ6 | δ7 | δ8 | δ9 | SSA MEASUREMENT |

JAMMING SATELLITE AVOIDANCE METHOD AND MEGA-CONSTELLATION BUSINESS DEVICE

CROSS-REFERENCE TO RELATED APPLICATIONS

The present application is based on PCT filing PCT/JP2021/010405, filed Mar. 15, 2021, which claims priority to JP 2020-048298, filed Mar. 18, 2020, the entire contents of each are incorporated herein by its reference.

TECHNICAL FIELD

The present disclosure relates to a jamming satellite avoidance method, an artificial satellite, a ground device, a mega-constellation business device, and a space traffic management system.

BACKGROUND ART

In recent years, large-scale satellite constellations including several hundred to several thousand satellites, which are called mega-constellations, have started to be constructed, and the risk of collision between satellites in orbit is increasing. In addition, space debris such as an artificial satellite that has become uncontrollable due to a failure or rocket debris has been increasing.

With the rapid increase in space objects such as satellites and space debris in outer space as described above, in space traffic management (STM) there is an increasing need to create international rules for avoiding collisions between space objects.

Patent Literature 1 discloses a technology for forming a satellite constellation composed of a plurality of satellites in the same circular orbit.

There is so far a system in which the Combined Space Operations Center (CSpOC) in the United States continues to monitor space objects and issues an alert when proximity or a collision between space objects is foreseen. At a manned space station and in a commercial communications satellite, an avoidance operation is performed in response to this alert when it is judged necessary.

CITATION LIST

Patent Literature

Patent Literature 1: 2017-114159 A

SUMMARY OF INVENTION

Technical Problem

If there is even a single space object of another business operator in an orbital altitude region of a mega-constellation satellite group composed of a large number of satellites, timing management to secure flight safety is extremely difficult. In particular, when propulsion devices are operated moment to moment to change orbit characteristics, an orbit prediction error becomes large and there is a risk that timing management of the satellite group in the mega-constellation itself cannot be performed. If a collision accident occurs between satellites in the mega-constellation satellite group as a result of avoiding a collision with a satellite of another business operator, it appears that there is no fault on the side of the satellite of the other business operator, so that a collision with the mega-constellation satellite group can be induced legally.

Patent Literature 1 does not describe a system for avoiding a collision when a space object of another business operator is present in an orbital altitude region of a mega-constellation satellite group.

An object of the present disclosure is to provide a system for avoiding a collision when a space object of another business operator is present in an orbital altitude region of a mega-constellation satellite group.

Solution to Problem

A jamming satellite avoidance method according to the present disclosure includes changing an orbital altitude for each of orbital planes with different normal vectors in a mega-constellation satellite group composed of 100 or more satellites, so as to avoid a jamming satellite controlled by a ground device that is different from a device that controls the mega-constellation satellite group.

Advantageous Effects of Invention

A jamming satellite avoidance method according to the present disclosure changes an orbital altitude individually for each of orbital planes with different normal vectors, so as to avoid a jamming satellite controlled by a ground device that is different from a device that controls a mega-constellation satellite group. Therefore, with the jamming satellite avoidance method according to the present disclosure, a collision can be avoided when a space object of another business operator is present in an orbital altitude region of the mega-constellation satellite group.

BRIEF DESCRIPTION OF DRAWINGS

FIG. 11 is an example of a functional configuration of a space traffic management system according to Embodiment 1;

DESCRIPTION OF EMBODIMENTS

Figure 1:
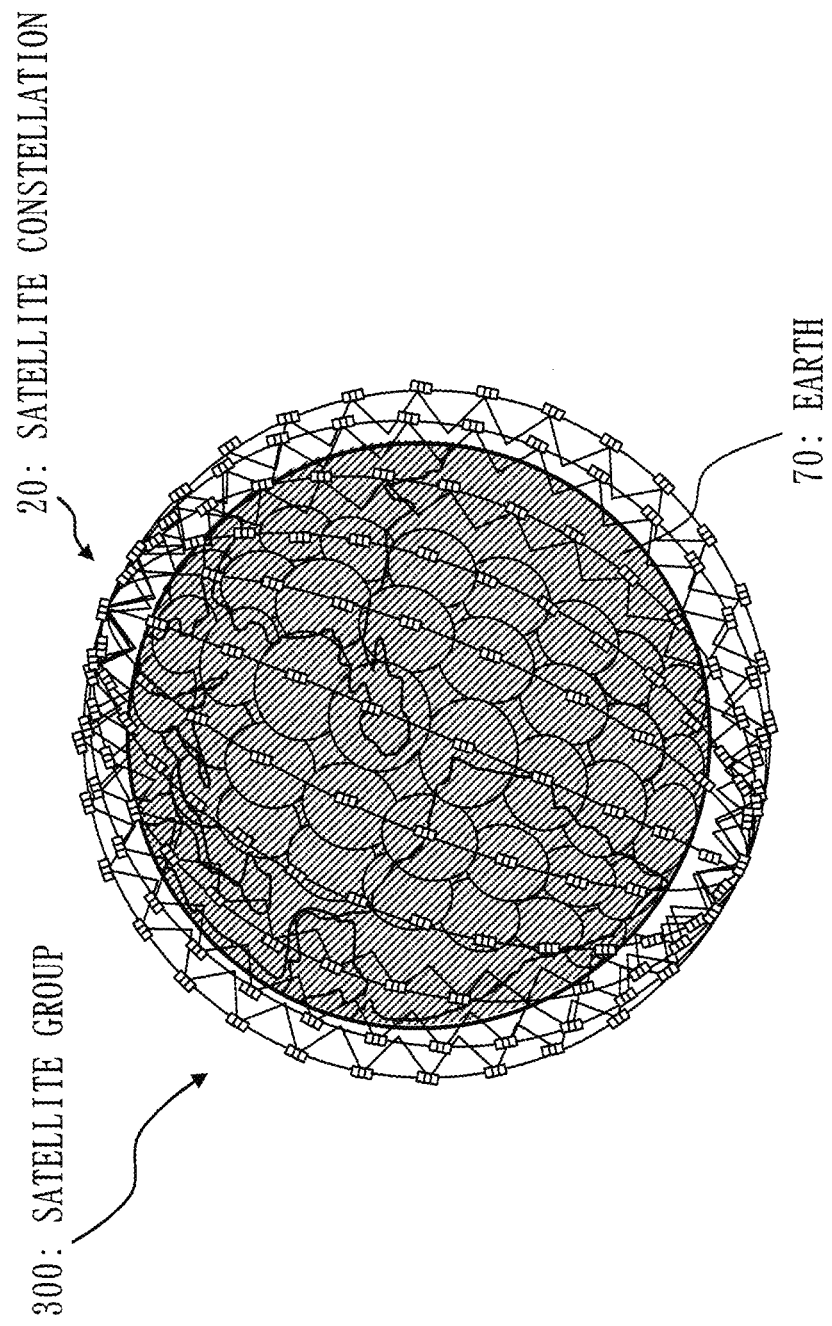
FIG. 1 is an example in which a plurality of satellites cooperatively realize a communication service to the ground over the entire globe of Earth.

Embodiments of the present disclosure will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

Examples of a satellite constellation assumed for a space traffic management system according to the following embodiments will be described.

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner. By providing adjacent orbital planes, a communication service can be provided to the ground with widespread coverage across the adjacent orbits. Similarly, by placing a large number of orbital planes at approximately equal intervals around Earth, a communication service to the ground can be provided over the entire globe.

Figure 2:
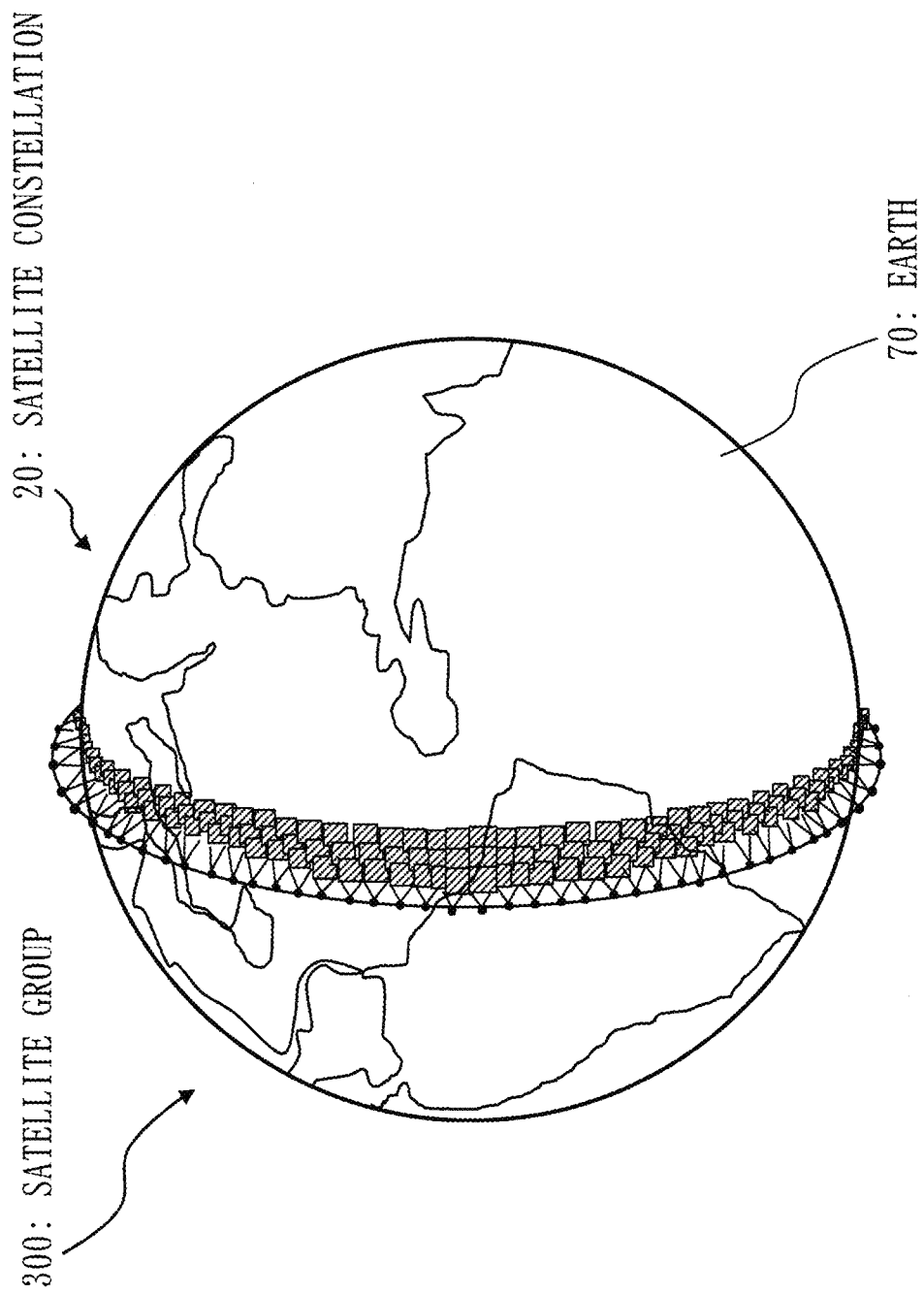
FIG. 2 is an example in which a plurality of satellites in a single orbital plane realize an Earth observation service.

FIG. 2 is a diagram illustrating an example in which a plurality of satellites in a single orbital plane realize an Earth observation service.

FIG. 2 illustrates a satellite constellation 20 that realizes an Earth observation service. In the satellite constellation 20 of FIG. 2, satellites each equipped with an Earth observation device, which is an optical sensor or a radio sensor such as synthetic-aperture radar, fly at the same altitude in the same orbital plane: In this way, in a satellite group 300 in which the ground imaging ranges of successive satellites overlap in a time-delay manner, a plurality of satellites in orbit provide an Earth observation service by capturing ground images in turn in a time-division manner.

As described above, the satellite constellation 20 is formed with the satellite group 300 composed of a plurality of satellites in each orbital plane. In the satellite constellation 20, the satellite group 300 cooperatively provides a service. Specifically, the satellite constellation 20 refers to a satellite constellation formed with one satellite group by a communications business service company as illustrated in FIG. 1 or an observation business service company as illustrated in FIG. 2.

Figure 3:
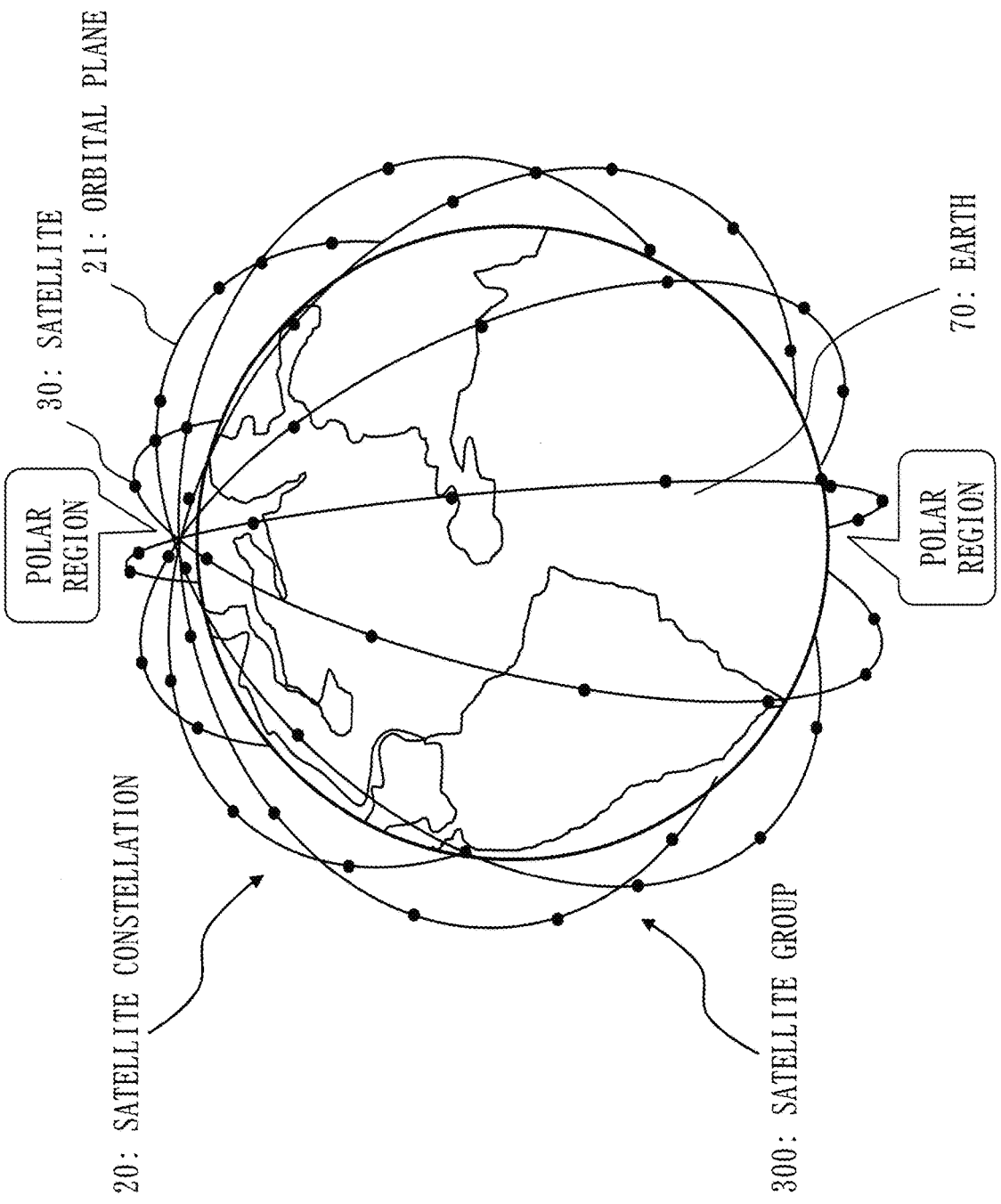
FIG. 3 is an example of a satellite constellation having a plurality of orbital planes that intersect in the vicinity of the polar regions.
Figure 4:
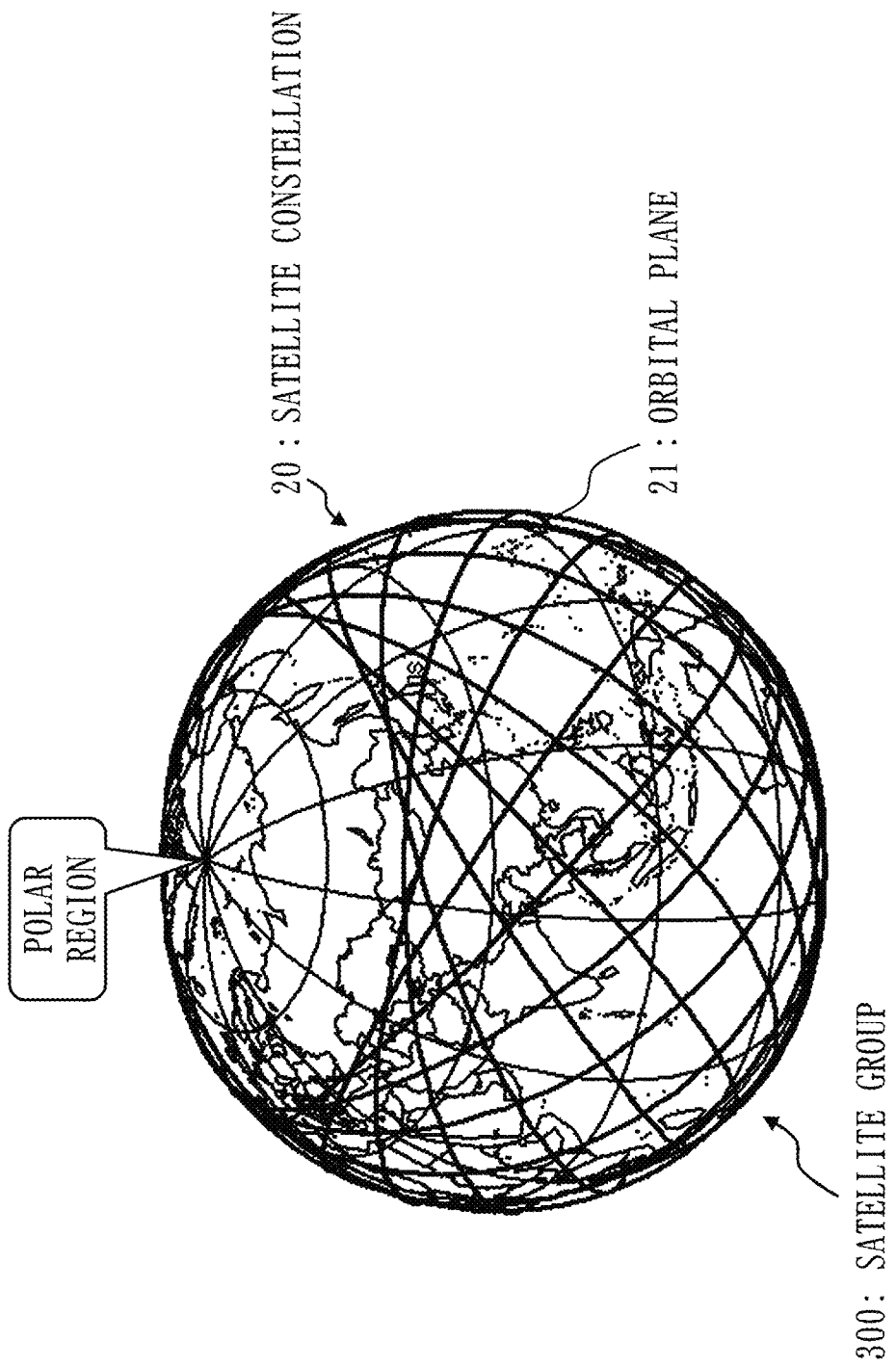
FIG. 4 is an example of a satellite constellation having a plurality of orbital planes that intersect outside the polar regions.

FIG. 3 is an example of a satellite constellation 20 having a plurality of orbital planes 21 that intersect in the vicinity of the polar regions. FIG. 4 is an example of a satellite constellation 20 having a plurality of orbital planes 21 that intersect outside the polar regions.

In the satellite constellation 20 of FIG. 3, the orbital inclination of each of the plurality of orbital planes 21 is about 90 degrees, and the orbital planes 21 exist on mutually different planes.

In the satellite constellation 20 of FIG. 4, the orbital inclination of each of the plurality of orbital planes 21 is not about 90 degrees, and the orbital planes 21 exist on mutually different planes.

In the satellite constellation 20 of FIG. 3, any given two orbital planes intersect at points in the vicinity of the polar regions. In the satellite constellation 20 of FIG. 4, any given two orbital planes intersect at points outside the polar regions. In FIG. 3, a collision between satellites 30 may occur in the vicinity of the polar regions. As illustrated in FIG. 4, the intersection points between the orbital planes each with an orbital inclination greater than 90 degrees move away from the polar regions according to the orbital inclination. Depending on the combinations of orbital planes, orbital planes may intersect at various locations including the vicinity of the equator. For this reason, places where collisions between satellites 30 may occur are diversified. A satellite 30 is referred to also as an artificial satellite.

In particular, in recent years, large-scale satellite constellations including several hundred to several thousand satellites have started to be constructed, and the risk of collision between satellites in orbit is increasing. In addition, space debris such as an artificial satellite that has become uncontrollable due to a failure or rocket debris has been increasing. A large-scale satellite constellation is also called a mega-constellation. Such debris is also called space debris.

As described above, with the increase in debris in outer space and the rapid increase in the number of satellites such as those in a mega-constellation, the need for space traffic management (STM) is increasing.

For orbital transfer of a space object, there has been increasing need for deorbit after completion of a mission in orbit (PMD), or ADR, which causes debris such as a failed satellite or an upper stage of a rocket that is floating to deorbit by external means such as a debris removal satellite. International discussions have begun as STM on the need for such ADR. PMD is an abbreviation for Post Mission Disposal. ADR is an abbreviation for Active Debris Removal. STM is an abbreviation for Space Traffic Management.

Referring to FIGS. 5 to 8, an example of a satellite 30 and a ground facility 700 in a satellite constellation forming system 600 that forms a satellite constellation 20 will be described. For example, the satellite constellation forming system 600 is operated by a business operator that conducts a satellite constellation business, such as a mega-constellation business device 41, an LEO constellation business device, or a satellite business device. LEO is an abbreviation for Low Earth Orbit.

A satellite control method by the satellite constellation forming system 600 is also applied to a business device 40 that controls a satellite. For example, it may be installed on business devices 40 such as a debris removal business device 45 that manages a debris removal satellite, a rocket launch business device 46 that launches a rocket, and an orbital transfer business device 44 that manages an orbital transfer satellite.

The satellite control method by the satellite constellation forming system 600 may be installed on any business device, provided that it is the business device of a business operator that manages a space object 60.

Each device of the business devices 40 will be described later.

Figure 5:
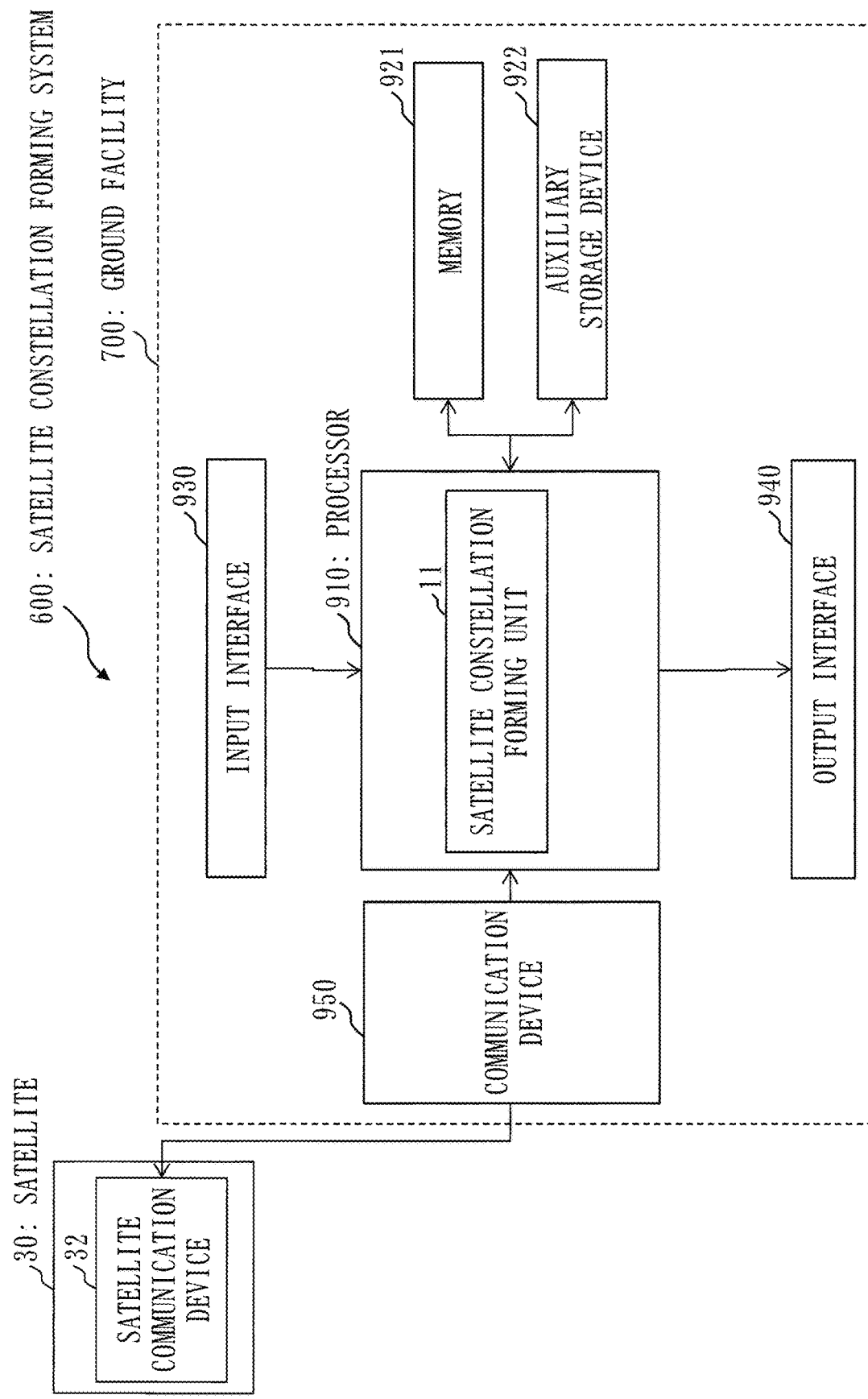
FIG. 5 is a configuration diagram of a satellite constellation forming system.

FIG. 5 is a configuration diagram of the satellite constellation forming system 600.

The satellite constellation forming system 600 includes a computer. FIG. 5 illustrates a configuration with one computer but, in practice, a computer is provided in each satellite 30 of a plurality of satellites constituting the satellite constellation 20 and the ground facility 700 that communicates with each satellite 30. The functions of the satellite constellation forming system 600 are realized cooperatively by the computers provided in each of the satellites 30 and the ground facility 700 that communicates with the satellites 30. In the following, an example of a configuration of the computer that realizes the functions of the satellite constellation forming system 600 will be described.

The satellite constellation forming system 600 includes the satellite 30 and the ground facility 700. The satellite 30 includes a satellite communication device 32 that communicates with a communication device 950 of the ground facility 700. Among the components included in the satellite 30, the satellite communication device 32 is illustrated in FIG. 5.

The satellite constellation forming system 600 includes a processor 910, and also includes other hardware components such as a memory 921, an auxiliary storage device 922, an input interface 930, an output interface 940, and a communication device 950. The processor 910 is connected with other hardware components via signal lines and controls these other hardware components. The hardware components of the satellite constellation forming system 600 are substantially the same as the hardware components of a space traffic management device 100 to be described later with reference to FIG. 9.

The satellite constellation forming system 600 includes a satellite constellation forming unit 11 as a functional element. The functions of the satellite constellation forming unit 11 are realized by hardware or software.

The satellite constellation forming unit 11 controls formation of the satellite constellation 20 while communicating with the satellite 30.

Figure 6:
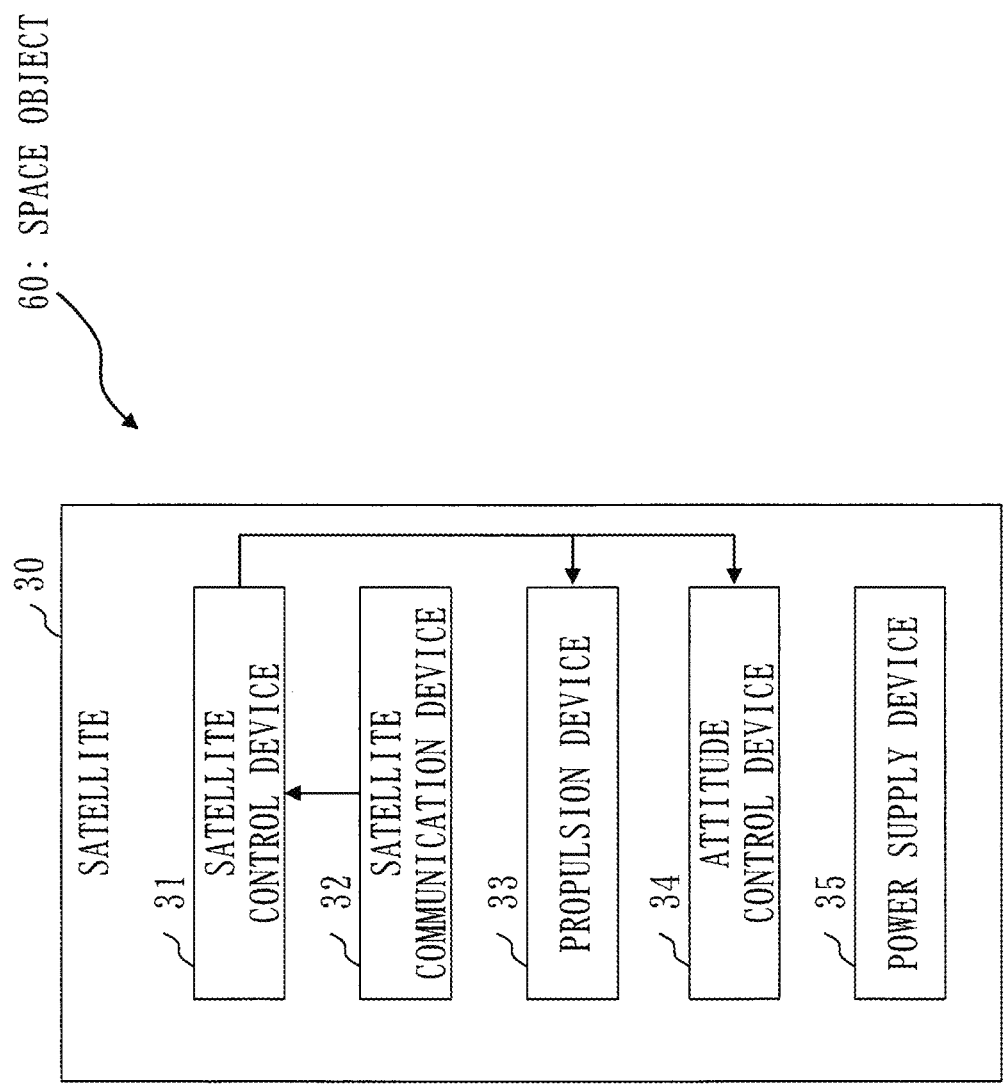
FIG. 6 is a configuration diagram of a satellite of the satellite constellation forming system.

FIG. 6 is a configuration diagram of the satellite 30 of the satellite constellation forming system 600.

The satellite 30 includes a satellite control device 31, the satellite communication device 32, a propulsion device 33, an attitude control device 34, and a power supply device 35. Although other constituent elements that realize various functions are included, the satellite control device 31, the satellite communication device 32, the propulsion device 33, the attitude control device 34, and the power supply device 35 will be described in FIG. 6. The satellite 30 is an example of a space object 60.

The satellite control device 31 is a computer that controls the propulsion device 33 and the attitude control device 34 and includes a processing circuit. Specifically, the satellite control device 31 controls the propulsion device 33 and the attitude control device 34 in accordance with various commands transmitted from the ground facility 700.

The satellite communication device 32 is a device that communicates with the ground facility 700. Specifically, the satellite communication device 32 transmits various types of data related to the satellite itself to the ground facility 700. The satellite communication device 32 also receives various commands transmitted from the ground facility 700.

The propulsion device 33 is a device that provides thrust force to the satellite 30 to change the velocity of the satellite 30. Specifically, the propulsion device 33 is an apogee kick motor, a chemical propulsion device, or an electric propulsion device. The apogee keck motor (AKM) is an upper-stage propulsion device used for orbital insertion of an artificial satellite, and is also called an apogee motor (when a solid rocket motor is used) or an apogee engine (when a liquid engine is used).

The chemical propulsion device is a thruster using monopropellant or bipropellant fuel. The electric propulsion device is an ion engine or a Hall thruster. The apogee kick motor is the name of a device used for orbital transfer and may be a type of chemical propulsion device.

The attitude control device 34 is a device to control the attitude of the satellite 30 and attitude elements, such as the angular velocity and the line of sight, of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator in accordance with measurement data of the attitude sensor or various commands from the ground facility 700.

The power supply device 35 includes equipment such as a solar cell, a battery, and an electric power control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

Figure 7:
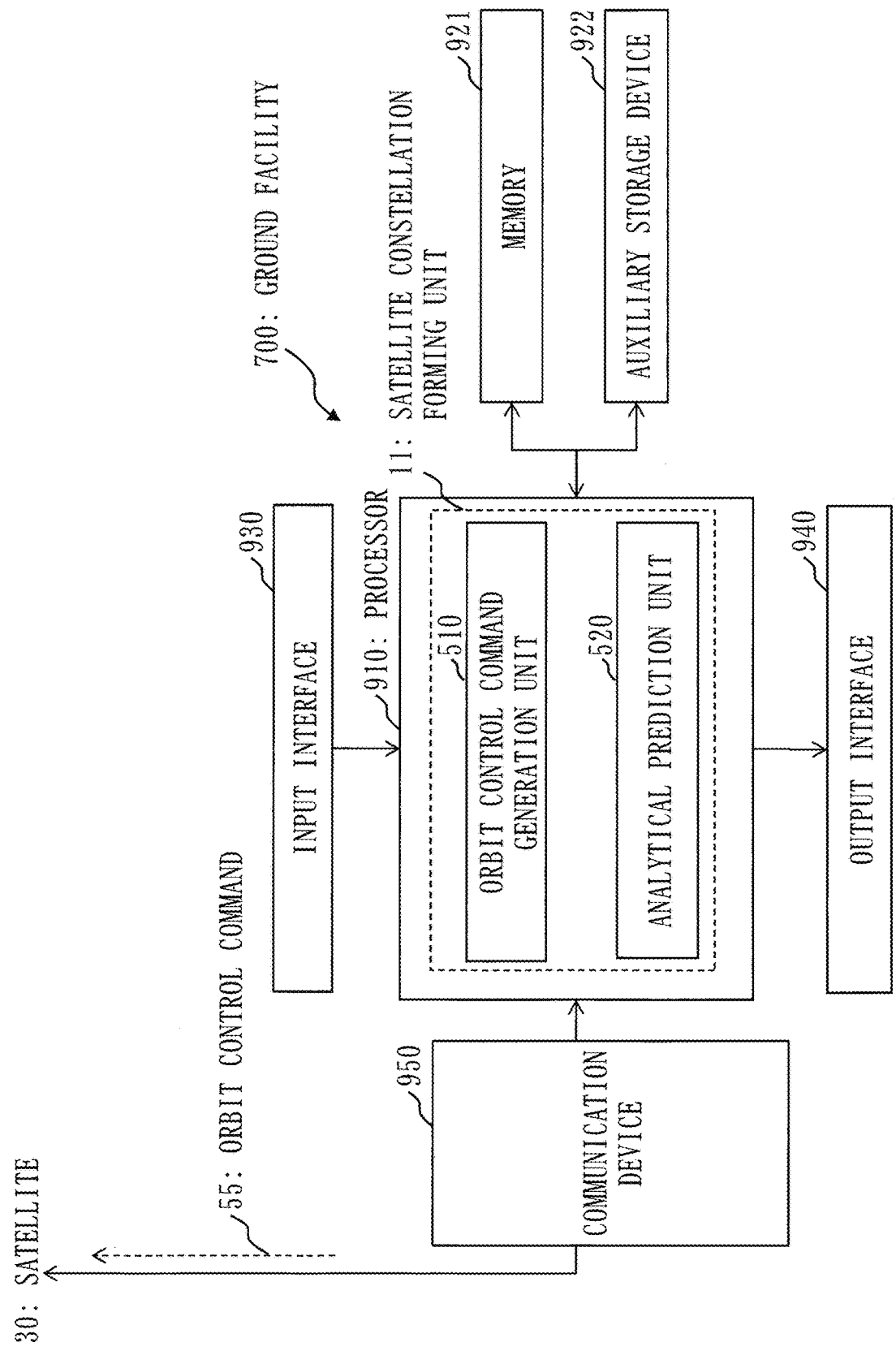
FIG. 7 is a configuration diagram of a ground facility of the satellite constellation forming system.

FIG. 7 is a configuration diagram of the ground facility 700 included in the satellite constellation forming system 600.

The ground facility 700 controls a large number of satellites in all orbital planes by programs. The ground facility 700 is an example of a ground device. The ground device is composed of a ground station, such as a ground antenna device, a communication device connected to a ground antenna device, or an electronic computer, and a ground facility as a server or terminal connected with the ground station via a network. The ground device may include a communication device installed in a mobile object such as an airplane, a self-driving vehicle, or a mobile terminal.

The ground facility 700 forms the satellite constellation 20 by communicating with each satellite 30. The ground facility 700 is provided in the space traffic management device 100. The ground facility 700 includes a processor 910 and also includes other hardware components such as a memory 921, an auxiliary storage device 922, an input interface 930, an output interface 940, and a communication device 950. The processor 910 is connected with other hardware components via signal lines and controls these other hardware components. The hardware components of the ground facility 700 are substantially the same as the hardware components of the space traffic management device 100 to be described later with reference to FIG. 9.

The ground facility 700 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 55 to each satellite 30.

The analytical prediction unit 520 performs analytical prediction on the orbit of the satellite 30.

The orbit control command generation unit 510 generates an orbit control command 55 to be transmitted to the satellite 30.

The orbit control command generation unit 510 and the analytical prediction unit 520 realize the functions of the satellite constellation forming unit 11. That is, the orbit control command generation unit 510 and the analytical prediction unit 520 are examples of the satellite constellation forming unit 11.

Figure 8:
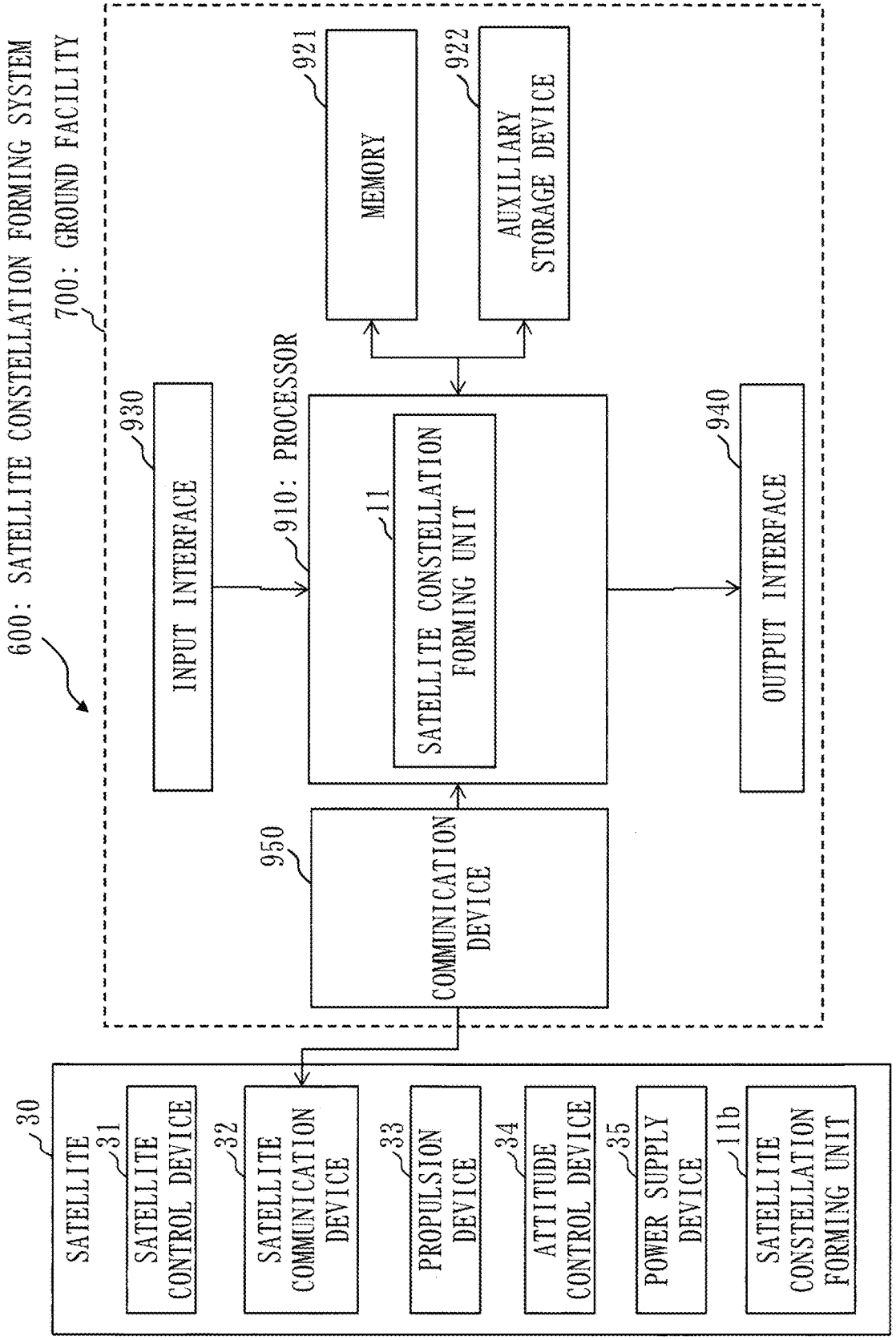
FIG. 8 is an example of a functional configuration of the satellite constellation forming system.

FIG. 8 is a diagram illustrating an example of a functional configuration of the satellite constellation forming system 600.

The satellite 30 further includes a satellite constellation forming unit 11b to form the satellite constellation 20. The functions of the satellite constellation forming system 600 are realized cooperatively by the satellite constellation forming unit 11b included in each satellite 30 of a plurality of satellites and the satellite constellation forming unit 11 included in the ground facility 700. The satellite constellation forming unit 11b of the satellite 30 may be included in the satellite control device 31.

*Description of Configurations*

A space traffic management system 500 according to this embodiment includes a collision avoidance assistance business device 43 and mega-constellation business devices 41. The collision avoidance assistance business device 43 assists avoidance of a collision between space objects in outer space. Each of the mega-constellation business devices 41 manages a mega-constellation, which is a satellite constellation composed of 100 or more satellites.

The space traffic management device 100 according to this embodiment is implemented in each of the collision avoidance assistance business device 43 and the mega-constellation business devices 41, and includes a database 211 and a server 212. The space traffic management device 100 may be implemented in an SSA business device 47 that conducts an SSA business, that is a space situational awareness business.

The space traffic management system 500 connects, with communication lines, the space traffic management devices 100 installed respectively in the SSA business device 47 and each of the mega-constellation business devices 41.

Figure 9:
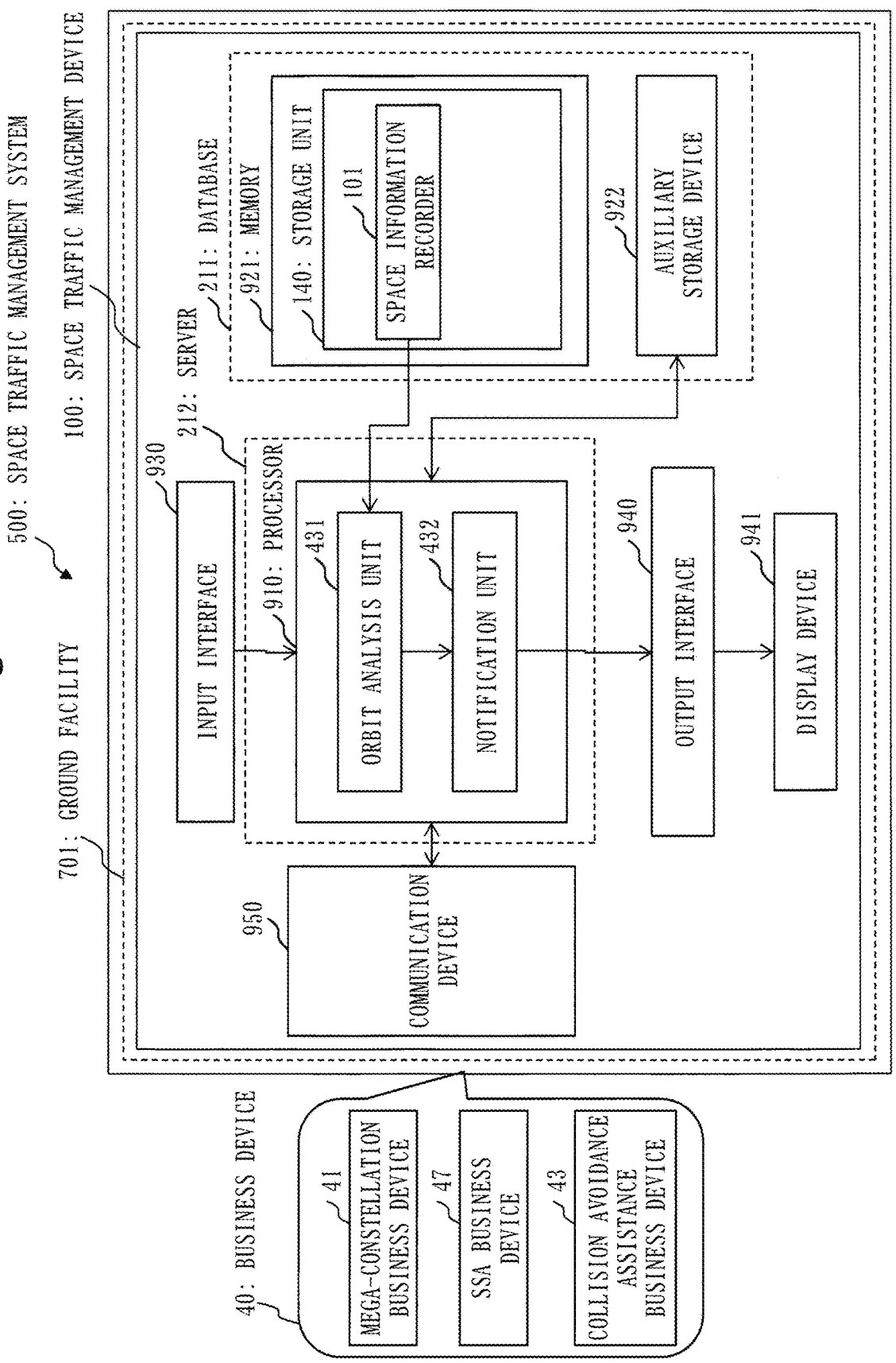
FIG. 9 is an example of a hardware configuration of a space traffic management device according to Embodiment 1.

FIG. 9 is a diagram illustrating an example of a hardware configuration of the space traffic management device 100 of the business device 40 according to this embodiment.

Figure 10:
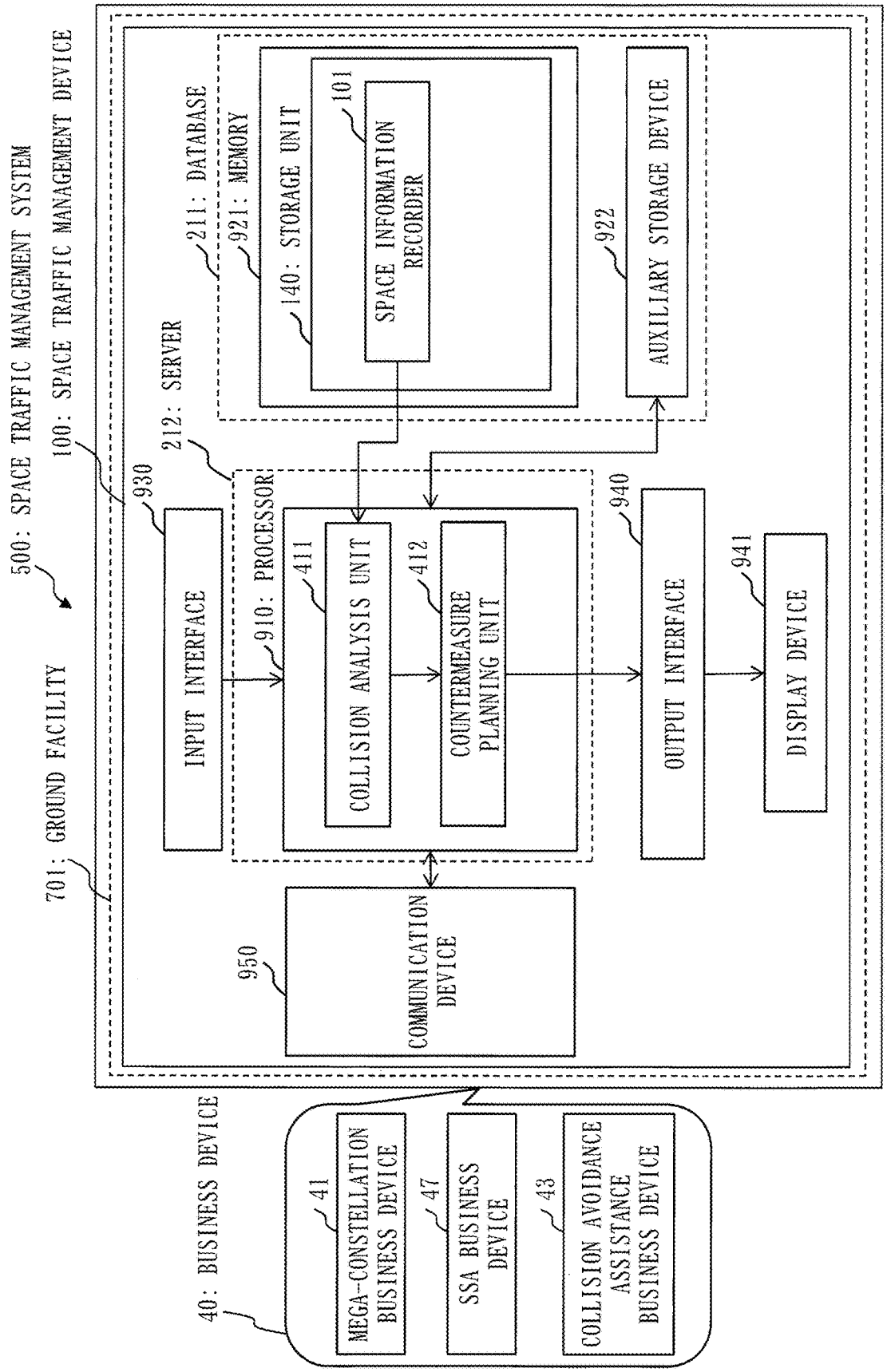
FIG. 10 is a diagram illustrating an example of orbit forecast information according to Embodiment 1.

FIG. 10 is a diagram illustrating an example of a hardware configuration of the space traffic management device 100 of the business device 40 according to this embodiment.

In this embodiment, the space traffic management device 100 is installed in each of each of the mega-constellation business devices 41, the SSA business device 47, and the collision avoidance assistance business device 43.

Each of the mega-constellation business devices 41 manages a satellite constellation composed of a plurality of satellites. Specifically, each of the mega-constellation business devices 41 is a computer of a mega-constellation business operator that conducts a large-scale satellite constellation, that is, mega-constellation business. For example, each of the mega-constellation business devices 41 is an example of a satellite constellation business device that manages a satellite constellation composed of 100 or more satellites.

The collision avoidance assistance business device 43 assists avoidance of a collision between space objects in outer space. Specifically, the collision avoidance assistance business device 43 is a computer of a collision avoidance assistance business operator that assists avoidance of a collision between space objects in outer space.

In addition to the mega-constellation business device 41, a space object business device 42, and the collision avoidance assistance business device 43, the business devices 40 may also include business devices such as an LEO constellation business device, a satellite business device, an orbital transfer business device, a debris removal business device, a rocket launch business device, and the SSA business device 47.

Each of the business devices 40 provides information related to a space object 60 such as an artificial satellite managed by each device or debris. Each of the business devices 40 is a computer of a business operator that collects information related to a space object 60 such as an artificial satellite or debris.

The LEO constellation business device is a computer of an LEO constellation business operator that operates a low Earth orbit constellation, that is, LEO constellation business.

The satellite business device is a computer of a satellite business operator that handles one to several satellites.

The orbital transfer business device is a computer of an orbital transfer business operator that performs a space object intrusion alert for satellites.

The debris removal business device is a computer of a debris removal business operator that conducts a business to retrieve debris.

The rocket launch business device is a computer of a rocket launch business operator that conducts a rocket launch business.

The SSA business device is a computer of an SSA business operator that conducts an SSA business, that is, a space situational awareness business.

The space traffic management device 100 may be installed in a ground facility 701 included in each of the business devices 40. The space traffic management device 100 may be installed in the satellite constellation forming system 600.

The space traffic management device 100 includes a processor 910 and also includes other hardware components such as a memory 921, an auxiliary storage device 922, an input interface 930, an output interface 940, and a communication device 950. The processor 910 is connected with other hardware components via signal lines and controls these other hardware components.

The processor 910 is an example of a server. The memory 921 and the auxiliary storage device 922 are examples of the database 211. The server 212 may include other hardware components such as the input interface 930, the output interface 940, the communication device 950, and a storage device. The server 212 realizes the functions of each of the mega-constellation business device 41, the SSA business device 47, and the collision avoidance assistance business device 43.

As illustrated in FIG. 9, the space traffic management device 100 includes an orbit analysis unit 431, a notification unit 432, and a storage unit 140 as an example of functional elements that realize a collision avoidance assistance function. The storage unit 140 stores a space information recorder 101.

As illustrated in FIG. 10, the space traffic management device 100 includes a collision analysis unit 411, a countermeasure planning unit 412, a storage unit 140 as an example of functional elements that realize a mega-constellation management function. The storage unit 140 stores a space information recorder 101.

The functions of the orbit analysis unit 431 and the notification unit 432 are realized by software. The storage unit 140 is included in the memory 921. Alternatively, the storage unit 140 may be included in the auxiliary storage device 922. The storage unit 140 may also be divided and included in the memory 921 and the auxiliary storage device 922.

In FIG. 9, it is assumed for description that the space traffic management device 100 realizes the collision avoidance assistance function. However, the space traffic management device 100 has various functions other than the collision avoidance assistance function.

The processor 910 is a device that executes a space traffic management program. The space traffic management program is a program that realizes the functions of the constituent elements of the space traffic management device 100 and the space traffic management system 500.

The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of a display device 941, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC). In this embodiment, the space traffic management devices 100 of the mega-constellation business devices 41, the SSA business device 47, and the collision avoidance assistance business device 43 communicate with one another via communication lines.

The space traffic management program is read into the processor 910 and executed by the processor 910. The memory 921 stores not only the space traffic management program but also an operating system (OS). The processor 910 executes the space traffic management program while executing the OS. The space traffic management program and the OS may be stored in the auxiliary storage device 922. The space traffic management program and the OS that are stored in the auxiliary storage device 922 are loaded into the memory 921 and executed by the processor 910. Part or the entirety of the space traffic management program may be embedded in the OS.

The space traffic management device 100 may include a plurality of processors as an alternative to the processor 910. These processors share the execution of programs. Each of the processors is, like the processor 910, a device that executes programs.

Data, information, signal values, and variable values that are used, processed, or output by programs are stored in the memory 921 or the auxiliary storage device 922, or stored in a register or a cache memory in the processor 910.

"Unit" of each unit of the space traffic management device may be interpreted as "process", "procedure", "means", "phase", or "step". "Process" of an orbit analysis process and a notification process may be interpreted as "program", "program product", or "computer readable recording medium recording a program". The terms "process", "procedure", "means", "phase", and "step" may be interpreted interchangeably.

The space traffic management program causes a computer to execute each process, each procedure, each means, each phase, or each step, where "unit" of each unit of the space traffic management system is interpreted as "process", "procedure", "means", "phase", or "step". A space traffic management method is a method performed by execution of the space traffic management program by the space traffic management device 100.

The space traffic management program may be stored and provided in a computer readable recording medium. Alternatively, each program may be provided as a program product.

FIG. 11 is a diagram illustrating an example of orbit forecast information 51 included in the space information recorder 101 according to this embodiment.

The space traffic management device 100 stores, in the storage unit 140, the orbit forecast information 51 in which forecast values of orbits of space objects 60 are set. For example, the space traffic management device 100 may acquire forecast values of the orbit of each of the space objects 60 from the business device 40 used by a management business operator that manages the space objects 60 and store them as the orbit forecast information 51. Alternatively, the space traffic management device 100 may acquire the orbit forecast information 51 in which forecast values of the orbit of each of the space objects 60 are set from the management business operator and store it in the storage unit 140.

The management business operator is a business operator that manages the space objects 60 that fly in outer space, such as a satellite constellation, various types of satellites, a rocket, and debris. As described above, the business device 40 used by each management business operator is a computer, such as a mega-constellation business device, an LEO constellation business device, a satellite business device, an orbital transfer business device, a debris removal business device, a rocket launch business device, and an SSA business device.

The orbit forecast information 51 includes satellite orbit forecast information 52 and debris orbit forecast information 53. In the satellite orbit forecast information 52, forecast values of orbits of satellites are set. In the debris orbit forecast information 53, forecast values of orbits of debris are set. In this embodiment, it is arranged that the satellite orbit forecast information 52 and the debris orbit forecast information 53 are included in the orbit forecast information 51. However, the satellite orbit forecast information 52 and the debris orbit forecast information 53 may be stored in the storage unit 140 as separate pieces of information.

In the orbit forecast information 51, information such as a space object identifier (ID) 511, a forecast epoch 512, forecast orbital elements 513, and a forecast error 514 is set, for example.

The space object ID 511 is an identifier that identifies a space object 60. In FIG. 10 FIG. 11, a satellite ID and a debris ID are set as the space object ID 511. Specifically, a space object is an object such as a rocket to be launched into outer space, an artificial satellite, a space station, a debris removal satellite, a planetary space probe, or a satellite or rocket that has become debris after completing a mission.

The forecast epoch 512 is an epoch that is forecast for the orbit of each of the space objects.

The forecast orbital elements 513 are orbital elements that identify the orbit of each of the space objects. The forecast orbital elements 513 are orbital elements that are forecast for the orbit of each of the space objects. In FIG. 11, the six Keplerian elements are set as the forecast orbital elements 513.

The forecast error 514 is an error that is forecast for the orbit of each of the space objects. In the forecast error 514, a traveling direction error, an orthogonal direction error, and a basis for the error are set. In this way, the forecast error 514 explicitly indicates the amount of error included in a record value together with the basis. The basis for the amount of error includes at least one or all of means for measurement, the content of data processing performed as means for improving the precision of location coordinate information, and a result of statistical evaluation on past data.

In the orbit forecast information 51 according to this embodiment, the forecast epoch 512 and the forecast orbital elements 513 are set for the space object 60. Using the forecast epoch 512 and the forecast orbital elements 513, the time and location coordinates of the space object 60 in the near future can be obtained. For example, the time and location coordinates of the space object 60 in the near future may be set in the orbit forecast information 51.

The orbit forecast information 51 thus includes information on the orbit of each space object including the epoch and orbital elements or the time and location coordinates, and explicitly indicates forecast values of the space object 60 in the near future.

<Jamming Satellite>

A jamming satellite is an artificial satellite that includes a propulsion device 33 and adopts a nominal orbital altitude and a nominal orbital inclination at which a mega-constellation satellite group flies. The jamming satellite flies while irregularly operating the propulsion device 33 and changing the orbital altitude and the orbital inclination. The jamming satellite maintains an average orbital altitude and an average orbital inclination in flight in a period of one week or one month at the same orbital altitude and orbital inclination as the nominal orbital altitude and the nominal orbital inclination at which the mega-constellation satellite group flies. The jamming satellite is controlled by a ground device that is different from a device that controls the mega-constellation satellite group.

The configuration of the jamming satellite is substantially the same as that of the space object 60 of FIG. 6.

The configuration of the ground device is substantially the same as the configuration of the ground facility 700 of FIG. 7.

In a mega-constellation composed of a satellite group of a large number of satellites, even if a satellite failure occurs, other satellites can complement functional performance. Therefore, it is easy to consider that it has high resilience as an infrastructure. However, in the satellite group that flies in formation at the same orbital altitude while being controlled synchronously, once a collision accident occurs, it is accompanied by a risk of chain-reaction collision. For this reason, in terms of risks, it has paradoxical vulnerability that the greater the number of satellites, the lower the resilience.

When a satellite group of several thousand satellites like a mega-constellation satellite group flies in the same orbit, if the orbit is a polar orbit with an orbital inclination close to 90 degrees as indicated in FIG. 3, the density of satellites is high in a region in the vicinity of each of the polar regions where all the orbital planes meet. Therefore, it is necessary to strictly control passage timings in the region of each of the polar regions.

If the orbit is an inclined orbit with an orbital inclination away from 90 degrees as indicated in FIG. 4, there is a risk of collision at an intersection point of orbital planes in a mid-latitude region. Therefore, it is necessary to strictly control passage timings to secure flight safety by shifting passage timings of satellites at all intersection points in a grid-like pattern.

In order to realize such strict passage timing control, each satellite group will fly while operating the propulsion devices from moment to moment.

If the satellite group flying in the same orbital altitude region includes only satellites of a single mega-constellation business operator, it is possible to grasp real-time high-precision orbit information of all the satellites and perform timing control of all the satellites.

However, if there is even a single space object of another business operator in this orbital altitude region, timing management to secure flight safety is extremely difficult.

In particular, when the propulsion devices are operated moment to moment to change orbit characteristics, an orbit prediction error becomes large and there is a risk that timing management of the satellite group in the mega-constellation itself cannot be performed.

If a collision accident occurs between satellites in the mega-constellation satellite group as a result of avoiding a collision with a satellite of another business operator, it appears that there is no fault on the side of the satellite of the other business operator, so that a collision with the mega-constellation satellite group can be induced legally.

That is, a satellite of another business operator that flies in the orbital altitude region of the mega-constellation satellite group can become a jamming satellite aiming at business interference or an A-SAT aiming at satellite destruction. However, unlike an A-SAT, which aims at explosive destruction, a satellite for a seemingly peaceful purpose can obtain an authorization from a nation or an authorized agency. Thus, a problem is that it is difficult to eliminate this by the space law or international consensus.

<Method for Avoiding a Collision with a Jamming Satellite>

A method for avoiding a collision with a jamming satellite will now be described in which even if the nominal orbital altitudes are the same, a collision is avoided by causing individual satellites constituting a mega-constellation satellite group to fly while changing the orbital altitude.

The mega-constellation business device 41 adopts a jamming satellite avoidance method in which the orbital altitude is changed individually for each of orbital planes with different normal vectors in a mega-constellation satellite group, so as to avoid a jamming satellite controlled by a ground device that is different from a device that controls the mega-constellation satellite group.

Specific examples will be described below.

Specific Example 1 of the Jamming Satellite Avoidance Method

The mega-constellation business device 41 can adopt orbital altitudes different from the orbital altitude of a jamming satellite by changing the orbital altitude individually for each of orbital planes with different normal vectors. Therefore, there is an effect that a collision with a jamming satellite can be avoided.

Furthermore, since the intersection points of orbital planes within the satellite group itself are eliminated, there is theoretically no risk of collision between satellites within the satellite group itself, so that there is an effect that a collision between satellites within the satellite group itself can be avoided without strict timing management.

Furthermore, unlike a case in which a large number of satellites fly at the same orbital altitude, there is an effect that a risk of chain-reaction collision can be reduced in the unlikely event that a collision accident occurs.

If only the orbital altitudes are changed, the revolution periods of the orbital planes will change, so that a problem is that the formation of the satellite group will be disrupted. However, by controlling the orbital inclinations to be optimal in conjunction with the orbital altitudes, the revolution periods of the orbital planes can be synchronized and the above problem can be resolved.

Specific Example 2 of the Jamming Satellite Avoidance Method

The mega-constellation business device 41 avoids a jamming satellite by changing the orbital altitude and orbital inclination individually for each of the orbital planes with different normal vectors.

Since satellites at different orbital altitudes have different ground speeds, when the orbital altitude and orbital inclination are changed individually for each of the orbital planes with different normal vectors, this causes a problem that the formation of the satellite group is changed in a mission in which the relative relationship between satellites in adjacent orbits is maintained. However, by synchronously controlling all the satellites so as to maintain the average orbital altitude and the average orbital inclination while changing the orbital altitudes and the orbital inclinations over time, the relative relationship between satellites in adjacent orbits can be roughly maintained.

Specific Example 3 of the Jamming Satellite Avoidance Method

The mega-constellation business device 41 controls the propulsion devices of mega-constellation satellites so as to synchronously control satellites flying in the same orbital plane, and causes the propulsion devices to operate in a forward direction and in a reverse direction of a flight direction alternately with a certain time delay between adjacent orbital planes. With such control, the average orbital altitude can be maintained while changing the orbital altitude individually for each orbital plane. In this case, the orbital inclination and the satellite ground speed are different for each orbital plane, but the average orbital inclination and satellite ground speed are maintained. Thus, the revolution periods of the orbital planes are synchronized, and the satellite ground speeds are maintained on average between adjacent orbital planes.

By repeating this operation in the order of arrangement of adjacent orbital planes, the orbital altitudes of the orbital planes are arranged in a sinusoidal form, and altitude differences in the sinusoidal form change in a wave form over time.

Figure 12:
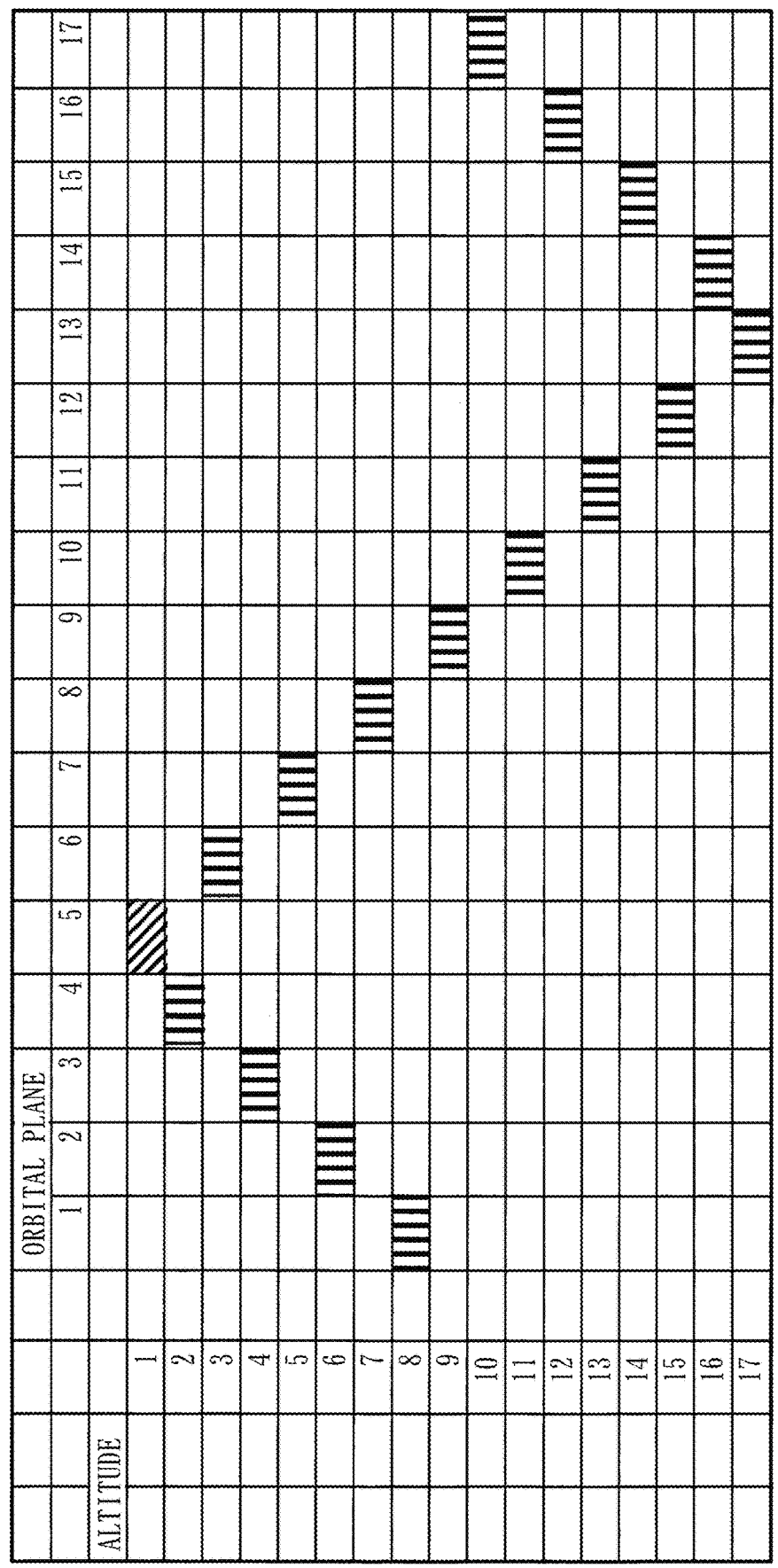
FIG. 12 is a diagram representing an example of relative altitude differences of a plurality of orbital planes of a mega-constellation satellite group according to Embodiment 1.

FIG. 12 is a diagram illustrating an example of relative altitude differences in a plurality of orbital planes of a mega-constellation satellite group according to this embodiment.

FIG. 12 illustrates relative altitude differences in orbital planes in a satellite constellation 20 having 17 orbital planes. The vertical axis indicates that the altitude of orbital plane 1 is highest, and the altitude becomes lower in descending order, and does not indicate the distance. FIG. 12 indicates that when orbital plane 1 is used as a reference plane and differences between adjacent planes are plotted, such as a difference in orbital altitude between orbital plane 1 and orbital plane 2 and a difference in orbital altitude between orbital plane 2 and orbital plane 3, this results in a sinusoidal form.

*Description of Operation*

Specific Example 4 of the Jamming Satellite Avoidance Method

Figure 13:
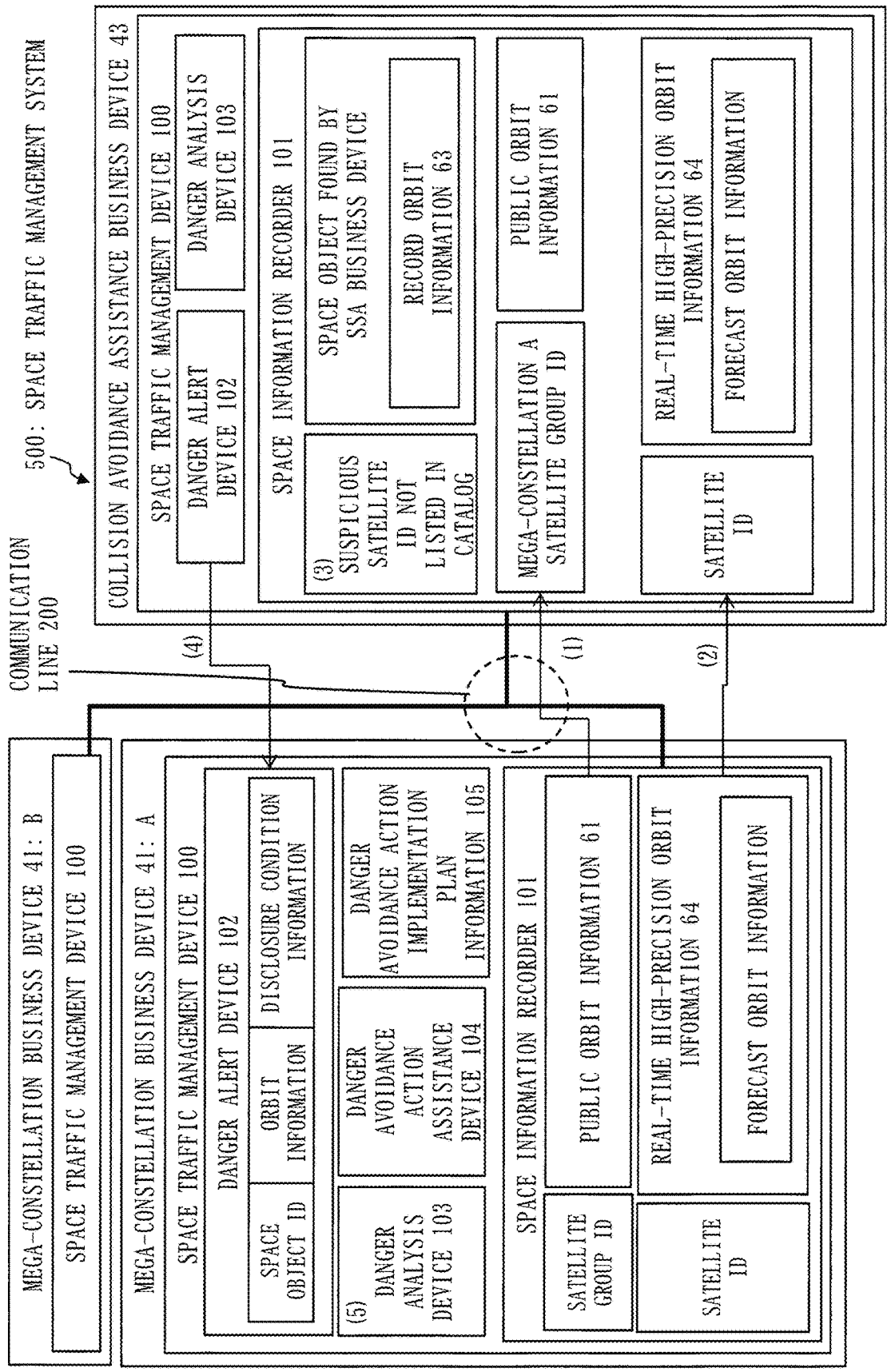
FIG. 13 is an example of a configuration of the space traffic management system according to Embodiment 1.

FIG. 13 is a diagram illustrating an example of a configuration of the space traffic management system 500 according to this embodiment.

Figure 14:
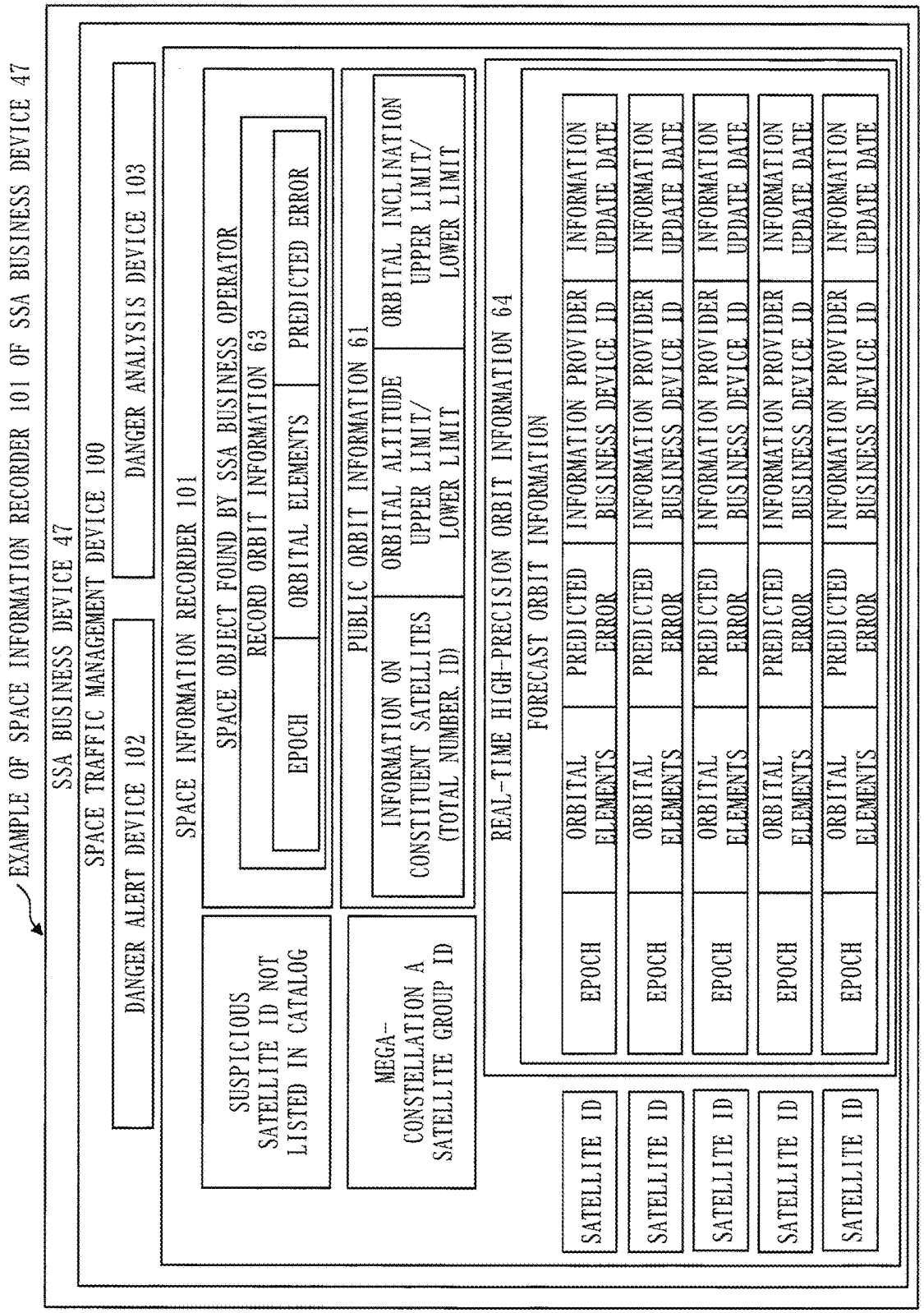
FIG. 14 is an example of a detailed configuration of a space information recorder of a mega-constellation business device according to Embodiment 1.

FIG. 14 is an example of a detailed configuration of the space information recorder 101 of the mega-constellation business device 41 according to this embodiment.

Figure 15:
FIG. 15 is an example of a detailed configuration of a space information recorder of an SSA business device according to Embodiment 1.

FIG. 15 is an example of a detailed configuration of the space information recorder 101 of the SSA business device 47 according to this embodiment.

Figure 16:
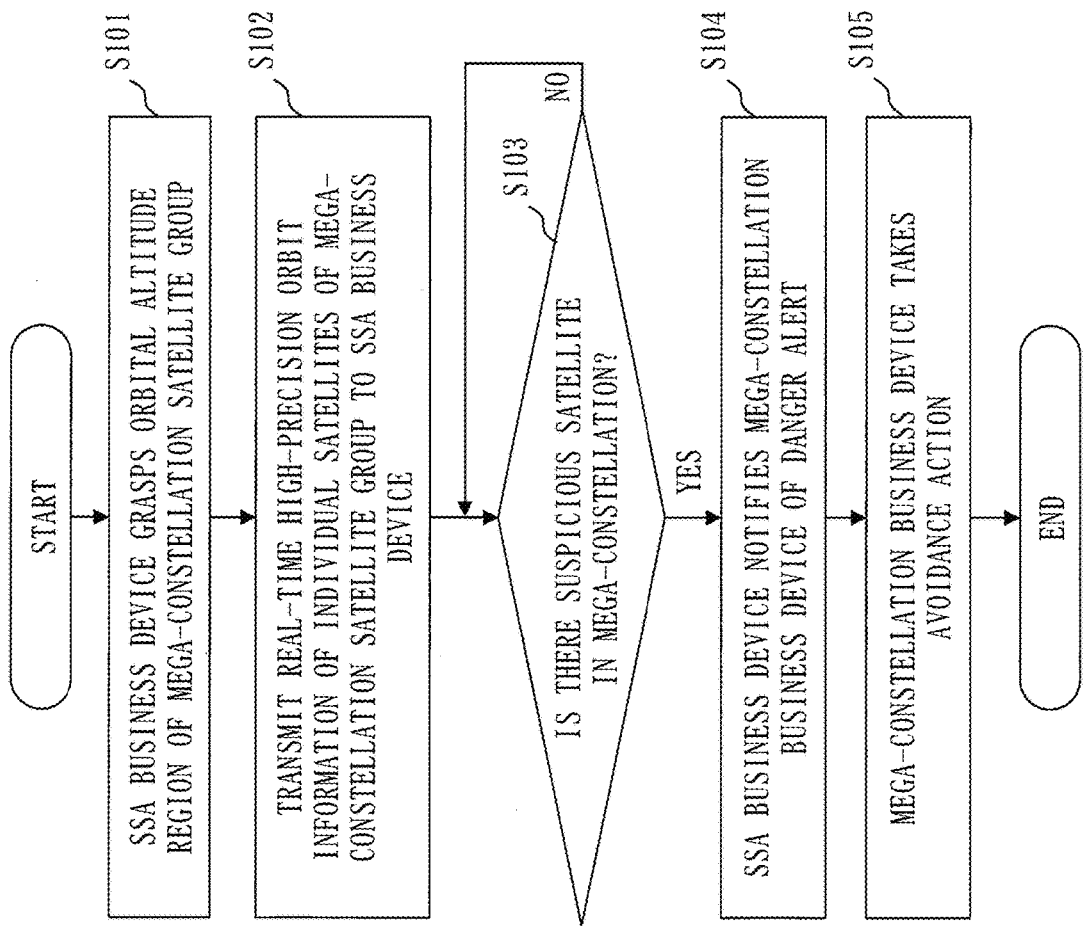
FIG. 16 is a flowchart of a jamming satellite avoidance method according to Embodiment 1.

FIG. 16 is a flowchart of the jamming satellite avoidance method according to this embodiment.

The mega-constellation business device 41 regularly transmits orbit information of individual satellites constituting the mega-constellation satellite group to the SSA business device 47. If there is a space object that is unaccounted for in the orbital altitude region where the mega-constellation satellite group flies, the SSA business device 47 notifies the mega-constellation business device 41 of a danger alert.

Specifically, this is as described below. The following (1) to (4) correspond to (1) to (4) of FIG. 13.

(1) In step S101, based on public orbit information of a mega-constellation satellite group A, the SSA business device 47 grasps its orbital altitude range.

(2) In step S102, the mega-constellation business device 41 regularly or irregularly transmits real-time high-precision orbit information of individual satellites in the mega-constellation satellite group A to the SSA business device 47.

(3) In step S103, the SSA business device 47 determines whether a suspicious satellite that is not listed in a catalog and is different from the satellites of the mega-constellation satellite group A has been found in the orbital altitude region of the mega-constellation satellite group A. If a suspicious satellite has been found, processing proceeds to step S104.

(4) In step S104, the SSA business device 47 notifies the mega-constellation business device 41 of a danger alert.

(5) In step S105, the mega-constellation business device 41 performs an avoidance action.

\*\*\*Description of Functions of Space Traffic Management System 500\*\*\*

With reference to FIGS. 13 to 15, an example of a functional configuration of the space traffic management system 500 according to this embodiment will now be described. The hardware configuration of each of the space traffic management devices 100 is as described above.

The space traffic management devices 100 included in the space traffic management system 500 are connected with one another via a communication line 200. The space traffic management devices 100 are provided respectively in the mega-constellation business devices 41 and the SSA business device 47. In FIG. 13, mega-constellation business devices A and B are illustrated as the mega-constellation business devices 41.

<Mega-Constellation Business Device 41>

The space traffic management device 100 of each of the mega-constellation business devices 41 includes the space information recorder 101, a danger alert device 102, a danger analysis device 103 to analyze the orbit of a space object, a danger avoidance action assistance device 104, and danger avoidance action implementation plan information 105.

The space information recorder 101 of each of the mega-constellation business devices 41 records orbit information of satellites constituting a mega-constellation. The space information recorder 101 includes public orbit information 61 associated with a satellite group ID that identifies a satellite group and real-time high-precision orbit information 64 associated with satellite IDs that identify satellites.

The public orbit information 61 is orbit information that can be disclosed to other business devices. In the public orbit information 61, information on constituent satellites, such as the number of satellites constituting the satellite group and satellite IDs, upper and lower limits of the orbital altitude of the satellite group, and upper and lower limits of the orbital inclination of the satellite group are set.

The real-time high-precision orbit information 64 is forecast orbit information and record orbit information of individual satellites constituting the satellite group. A specific example of the forecast orbit information is the orbit forecast information 51 of FIG. 10.

The danger alert device 102 notifies a danger of proximity or collision with a space object. The danger alert device 102 has orbit information associated with a space object ID that identifies a space object, and also has disclosure condition information in which a disclosure condition for the orbit information is set.

The danger analysis device 103 analyzes the orbit of a space object. For example, the danger analysis device 103 is an example of the collision analysis unit 411 that analyzes a collision between a space object S that is a suspicious satellite and individual satellites constituting a mega-constellation satellite group. That is, the server 212 included in the space traffic management device 100 of the mega-constellation business device 41 analyzes a collision between a space object that is a suspicious satellite and individual satellites constituting the mega-constellation satellite group.

The danger avoidance action assistance device 104 plans responsibility assignment for an avoidance action for a space object. For example, the danger avoidance action assistance device 104 is an example of the countermeasure planning unit 412 that plans a collision avoidance countermeasure when a collision between the mega-constellation and the space object S is foreseen. That is, the server 212 included in the space traffic management device 100 of the mega-constellation business device 41 plans a collision avoidance countermeasure when a collision is foreseen.

In the danger avoidance action implementation plan information 105, an avoidance action plan created by the danger avoidance action assistance device 104 is set.

In the real-time high-precision orbit information 64, forecast orbit information is set in association with the satellite IDs. These pieces of forecast orbit information are set such that they are real-time and highly precise.

The space traffic management device 100 of the SSA business device 47 includes the space information recorder 101, a danger alert device 102, and a danger analysis device 103.

The database 211 included in the space traffic management device 100 of the SSA business device 47 records orbit information of mega-constellation satellite groups acquired from the mega-constellation business devices 41 and orbit information of a space object that is a suspicious satellite not listed in a catalog. Specifically, the space information recorder 101 of the SSA business device 47 records public orbit information 61 of the mega-constellation satellite group acquired from the mega-constellation business device A and record orbit information 63 of a space object found by the SSA business device 47.

The public orbit information 61 is orbit information of the mega-constellation satellite group acquired from the mega-constellation business device A.

The configurations of the public orbit information 61 and the real-time high-precision orbit information 64 are substantially the same as those of the mega-constellation business device 41.

The danger analysis device 103 analyses the orbit of a space object. The danger analysis device 103 is an example of the orbit analysis unit 431 that identifies a mega-constellation satellite group formed at an orbital altitude through which a space object that is a suspicious satellite is expected to pass during flight. That is, the server 212 included in the space traffic management device 100 of the collision avoidance assistance business device 43 identifies a mega-constellation satellite group formed at an orbital altitude through which a space object that is a suspicious satellite is expected to pass during flight.

The danger alert device 102 notifies a danger of proximity or collision with a space object that is a suspicious satellite. The danger alert device 102 is an example of the notification unit 432 that, when it is foreseen that the space object S that is a suspicious satellite will intrude into the orbital altitude region where a satellite constellation satellite group flies, notifies the mega-constellation business operator of a danger alert and the record orbit information 63 of the space object that is the suspicious satellite via the communication line 200. That is, the server 212 included in the space traffic management device 100 of the collision avoidance assistance business device 43 notifies the mega-constellation business device 41 that manages a mega-constellation satellite group of a danger alert and the orbit information of a space object that is a suspicious satellite.

*Other Configurations*

In this embodiment, the functions of the space traffic management device 100 are realized by software. As a variation, the functions of the space traffic management device 100 may be realized by hardware.

Figure 17:
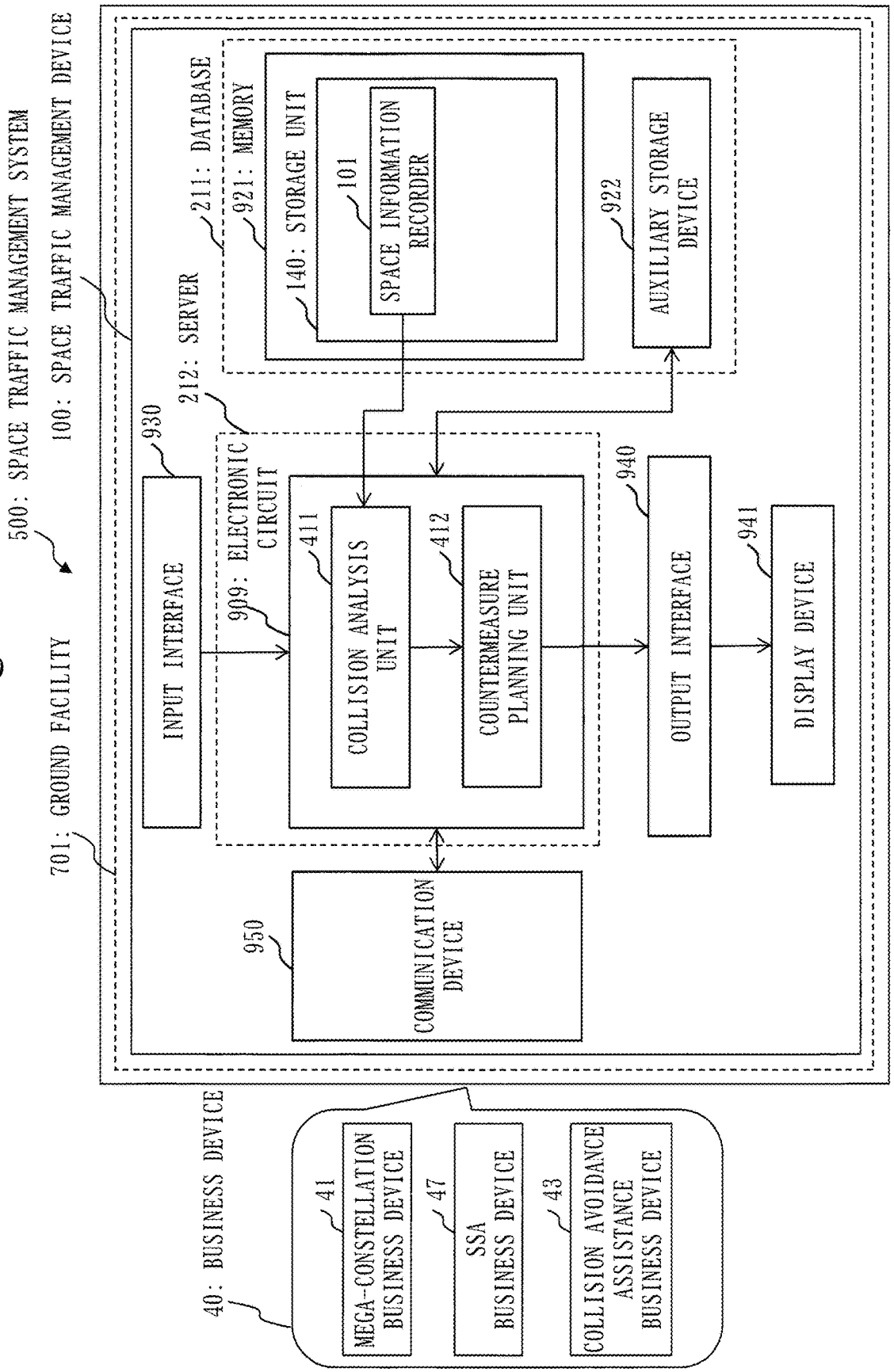
FIG. 17 is an example of a hardware configuration of the space traffic management device according to a variation of Embodiment 1.

In FIG. 17, a hardware configuration of the space traffic management device 100 according to a variation of this embodiment will be described. The hardware configuration of the space traffic management device 100 will be described using the space traffic management device 100 of the mega-constellation business device 41 as an example. It is assumed that the space traffic management devices 100 of the other business devices 40 also have substantially the same hardware configuration.

As described above, the space traffic management device 100 of the mega-constellation business device 41 includes the collision analysis unit 411, the countermeasure planning unit 412, and the storage unit 140 as an example of functional elements that realize the mega-constellation management function.

The space traffic management device 100 includes an electronic circuit 909 in place of the processor 910.

The electronic circuit 909 is a dedicated electronic circuit that realizes the functions of the space traffic management device 100.

Specifically, the electronic circuit 909 is a single circuit, a composite circuit, a programmed processor, a parallel-programmed processor, a logic IC, a GA, an ASIC, or an FPGA. GA is an abbreviation for Gate Array.

The functions of the space traffic management device 100 may be realized by one electronic circuit, or may be distributed among and realized by a plurality of electronic circuits.

As another variation, some of the functions of the space traffic management device 100 may be realized by the electronic circuit, and the rest of the functions may be realized by software.

Each of the processor and the electronic circuit is also called processing circuitry. That is, the functions of the space traffic management device 100 are realized by the processing circuitry.

*Description of Effects of this Embodiment*

With the jamming satellite avoidance method according to the present disclosure, a collision can be avoided when a space object of another business operator is present in an orbital altitude region of a mega-constellation satellite group.

With the space traffic management system according to the present disclosure, avoidance of a collision with a suspicious satellite that is unaccounted for can be performed cooperatively by a mega-constellation business device and an SSA business device.

Embodiment 2

In this embodiment, a jamming satellite avoidance method for avoiding radio jamming by a jamming satellite will be described.

The jamming satellite according to this embodiment is an artificial satellite that adopts a nominal orbital altitude and a nominal orbital inclination at which a mega-constellation satellite group flies. The jamming satellite includes a radio transmitter of the L band or one or more of the X band, the C band, the Ku band, and the Ka band. The jamming satellite is controlled by a ground device that is different from a device that controls the mega-constellation satellite group. Furthermore, the jamming satellite transmits radio waves by being controlled by the ground device in a region where another artificial satellite that receives radio waves or a ground facility does not fly.

The configuration of the jamming satellite is substantially the same as that of the space object 60 of FIG. 6.

The configuration of the ground device is substantially the same as the configuration of the ground facility 700 of FIG. 7.

The mega-constellation business device 41 changes the frequency of radio waves to be transmitted or received or performs spread spectrum in the mega-constellation satellite group. By this, the mega-constellation business device 41 adopts the jamming satellite avoidance method for avoiding radio jamming by the jamming satellite controlled by the ground device that is different from the device that controls the mega-constellation satellite group.

If a jamming signal in the same frequency band as that of a command signal is transmitted in the vicinity of the mega-constellation satellite group, there is a risk that control of the mega-constellation is paralyzed. In the case of the same frequency band as that of a communication service signal, there is a risk of radio jamming. However, there is a concern that radio waves for short-range communication that are transmitted when satellites pass in the vicinity of each other have a weak radio field intensity, so that they cannot be restricted by the radio law. In order to avoid such jamming, an effective countermeasure is to improve resilience to interfering waves by changing frequencies in orbit, which is called frequency hopping, or a band spread technique called spread spectrum.

*Description of Effects of this Embodiment*

With the jamming satellite avoidance method according to the present disclosure, it is possible to avoid radio interference to a mega-constellation satellite group by a jamming satellite.

In Embodiments 1 and 2 above, each unit of the space traffic management system and the space traffic management device has been described as an independent functional block. However, the configurations of the space traffic management system and the space traffic management device may be different from the configurations described in the above embodiments. The functional blocks of the space traffic management system and the space traffic management device may be arranged in any configuration, provided that the functions described in the above embodiments can be realized. Each of the space traffic management system and the space traffic management device may be a single device or a system composed of a plurality of devices.

Portions of Embodiments 1 and 2 may be implemented in combination. Alternatively, one portion of these embodiments may be implemented. These embodiments may be implemented as a whole or partially in any combination.

That is, in Embodiments 1 and 2, portions of Embodiments 1 and 2 may be freely combined, or any constituent element may be modified. Alternatively, in Embodiments 1 and 2, any constituent element may be omitted.

The embodiments described above are essentially preferable examples and are not intended to limit the scope of the present disclosure, the scope of applications of the present disclosure, and the scope of uses of the present disclosure. The embodiments described above can be modified in various ways as necessary.

REFERENCE SIGNS LIST

20: satellite constellation; 21: orbital plane; 211: database; 212: server; 30: satellite; 31: satellite control device; 32: satellite communication device; 33: propulsion device; 34: attitude control device; 35: power supply device; 40: business device; 41: mega-constellation business device; 411: collision analysis unit; 412: countermeasure planning unit; 431: orbit analysis unit; 432: notification unit; 42: space object business device; 43: collision avoidance assistance business device; 44: orbital transfer business device; 45: debris removal business device; 46: rocket launch business device; 47: SSA business device; 51: orbit forecast information; 52: satellite orbit forecast information; 53: debris orbit forecast information; 511: space object ID; 512: forecast epoch; 513: forecast orbital elements; 514: forecast error; 60: space object; 70: Earth; 100: space traffic management device; 140: storage unit; 55: orbit control command; 61: public orbit information; 63: record orbit information; 64: real-time high-precision orbit information; 500: space traffic management system; 600: satellite constellation forming system; 11, 11b: satellite constellation forming unit; 300: satellite group; 700, 701: ground facility; 510: orbit control command generation unit; 520: analytical prediction unit; 909: electronic circuit; 910: processor; 921: memory; 922: auxiliary storage device; 930: input interface; 940: output interface; 941: display device; 950: communication device; 101: space information recorder; 102: danger alert device; 103: danger analysis device; 104: danger avoidance action assistance device; 105: danger avoidance action implementation plan information; 200: communication line.

The invention claimed is:

1. A jamming satellite avoidance method, comprising:
changing an orbital altitude for each of orbital planes, each of the orbital planes existing on mutually different planes, in a mega-constellation satellite group composed of 100 or more satellites, so as to avoid a jamming satellite controlled by a ground device that is different from a device that controls the mega-constellation satellite group; and
synchronously controlling the 100 or more satellites to maintain an average orbital altitude and an average orbital inclination for the mega-constellation satellite group relative to a nominal orbital altitude and a nominal orbital inclination at which the mega-constellation satellite group flies while changing the orbital altitude and the orbital inclination for each of the orbital planes over time.

2. A jamming satellite avoidance method, comprising:
changing a frequency of a radio wave to be transmitted or received or performing spread spectrum in a mega-constellation satellite group composed of 100 or more satellites, so as to avoid radio jamming by a jamming satellite controlled by a ground device that is different from a device that controls the mega-constellation satellite group; and
synchronously controlling the 100 or more satellites to maintain an average orbital altitude and an average orbital inclination for the mega-constellation satellite group relative to a nominal orbital altitude and a nominal orbital inclination at which the mega-constellation satellite group flies while changing the orbital altitude and the orbital inclination for each of the orbital planes over time.

3. A mega-constellation business device to control a mega-constellation satellite group composed of 100 or more satellites, the mega-constellation business device, comprising:
processing circuitry configured to
change an orbital altitude for each of orbital planes, each of the orbital planes existing on mutually different planes, so as to avoid a jamming satellite controlled by a ground device that is different from a device that controls the mega-constellation satellite group, and
synchronously control the 100 or more satellites to maintain an average orbital altitude and an average orbital inclination for the mega-constellation satellite group relative to a nominal orbital altitude and a nominal orbital inclination at which the mega-constellation satellite group flies while changing the orbital altitude and the orbital inclination for each of the orbital planes over time.

4. A mega-constellation business device to control a mega-constellation satellite group composed of 100 or more satellites, the mega-constellation business device, comprising:
processing circuitry configured to
change a frequency of a radio wave to be transmitted or received or performing spread spectrum, so as to avoid radio jamming by a jamming satellite controlled by a ground device that is different from a device that controls the mega-constellation satellite group, and
synchronously control the 100 or more satellites to maintain an average orbital altitude and an average orbital inclination for the mega-constellation satellite group relative to a nominal orbital altitude and a nominal orbital inclination at which the mega-constellation satellite group flies while changing the orbital altitude and the orbital inclination for each of the orbital planes over time.

* * * * *